United States Patent
Yang et al.

(10) Patent No.: US 11,152,786 B2
(45) Date of Patent: Oct. 19, 2021

(54) DISPATCH METHOD AND DEVICE FOR POWER SYSTEM

(71) Applicant: Tsinghua University, Beijing (CN)

(72) Inventors: Zhifang Yang, Beijing (CN); Haiwang Zhong, Beijing (CN); Qing Xia, Beijing (CN); Chunling Lu, Beijing (CN); Xiaowen Lai, Beijing (CN); Yang Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 19 days.

(21) Appl. No.: 16/751,915

(22) Filed: Jan. 24, 2020

(65) Prior Publication Data

US 2020/0161863 A1 May 21, 2020

Related U.S. Application Data (63) Continuation of application No. PCT/CN2018/094555, filed on Jul. 4, 2018.

(30) Foreign Application Priority Data

Dec. 22, 2017 (CN) .......................... 201711401494.4

(51) Int. Cl.
*H02J 3/16* (2006.01)
*H02J 3/46* (2006.01)

(52) U.S. Cl.
CPC .................. *H02J 3/16* (2013.01); *H02J 3/46* (2013.01); *G05B 2219/2639* (2013.01); *H02J 2203/20* (2020.01)

(58) Field of Classification Search
CPC .. H02J 3/16; H02J 3/46; H02J 2203/20; H02J 2203/10; H02J 3/466; G05B 2219/2639; Y02E 60/00; Y02E 40/70; Y02E 40/30; Y04S 40/20; Y04S 10/50
See application file for complete search history.

(56) References Cited

U.S. PATENT DOCUMENTS

| 10,361,561 B2 * | 7/2019 | Wu ........................ G06Q 50/06 |
| 2015/0268644 A1 * | 9/2015 | Zhong ....................... H02J 3/00 700/287 |

FOREIGN PATENT DOCUMENTS

| GN | 108054757 | 5/2018 |
| GN | 108054789 | 5/2018 |

OTHER PUBLICATIONS

"Optimal power flow based on successive linear approximation of power flow equations", by Z Yang, ISSN: 1751-8687, 1751-8695; DOI: 10.1049/iet-gtd.2016.0547, IET Generation, Transmission & Distribution, 2016, vol. 10(14), p. 3654, published in Nov. 2016 (Year: 2016).*
WIPO, ISR for PCT/CN2018/094555, dated Sep. 5, 2018.

* cited by examiner

*Primary Examiner* — Thomas C Lee
*Assistant Examiner* — Charles Cai
(74) *Attorney, Agent, or Firm* — Hodgson Russ LLP (57) ABSTRACT

A dispatch method and device for a power system are provided. The method includes: establishing an optimal power flow model, the optimal power flow model includes an objective function and constraints, the objective function is configured to indicate a minimum total cost of active power production and reactive power production of generators; solving the optimal power flow model to obtain dispatch parameters for the power system; and dispatching the power system based on the dispatch parameters.

15 Claims, 3 Drawing Sheets

DISPATCH METHOD AND DEVICE FOR POWER SYSTEM

CROSS-REFERENCE TO RELATED APPLICATION

This application is a continuation of International Application No. PCT/CN2018/094555, filed Jul. 4, 2018, which claims priority to Chinese Patent Application No. 201711401494.4, filed Dec. 22, 2017, the entire disclosures of which are incorporated herein by reference.

FIELD

The present disclosure relates to the field of power system dispatch technology, and more particularly relates to a dispatch method and device for a power system.

BACKGROUND

The economic dispatch method in the related art is difficult to ensure high calculation accuracy, high calculation efficiency and good convergence while considering reactive power and voltage.

SUMMARY

Embodiments of the present disclosure provides a dispatch method for a power system. The method includes: establishing an optimal power flow model, the optimal power flow model includes an objective function and constraints, the objective function is configured to indicate a minimum total cost of active power production and reactive power production of generators; solving the optimal power flow model to obtain dispatch parameters for the power system; and dispatching the power system based on the dispatch parameters.

Embodiments of the present disclosure provide a non-transitory computer-readable storage medium having stored therein instructions that, when executed by a processor of a computer, causes the computer to perform the above dispatching method for a power system according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

The present disclosure provides a dispatch method for a power system, the optimal power flow model is solved using a successive linear method, in the first iteration, the power flow equation constraints are established by cold-start or hot-start, and the corresponding optimal power flow model can be obtained. In each subsequent iteration, the power flow equation constraints are updated based on the optimal solution of the previous iteration. With the method, the error of the linear approximation power flow equation is taken as a convergence criterion, when the optimal solution meets the convergence criterion, it is considered that the accuracy of the linear approximation meets the requirements. By making minor corrections to the optimization result through the AC feasibility module, the obtained optimization results will be feasible and close to the AC optimal. In order to correct the potential overrun caused by the constraint, it is determined whether there is overrun, when there is overrun, the corresponding constraint limit value is tightened, to re-construct the optimal power flow model, such that the operating parameters are safe and economic.

In order to achieve secure and stable operation of power grids, the nodes in the power grids need to follow some rules. Safety-constrained economic dispatch is based on the regulation behavior that the power flow of each node and line in the power grid is within the safety constraints, to minimize the operating costs of the power grid. The safety-constrained economic dispatch needs to solve the AC (alternating current) optimal power flow problem, and the non-linear characteristics of the AC power flow equation make it a non-convex optimization problem, which is difficult to solve.

In the related art, the DC (direct current) power flow network model considering only active power is widely used in the power industry. In the DC power flow network model, reactive power and network loss are ignored, and it is assumed that the voltage magnitude of each node is a standard value (1.0 p.u. (per unit)). In the DC power flow equation, the active and voltage angles are linear. In industry, power flow calculations are performed on the basis of the DC optimal power flow solution to obtain an AC feasible dispatching scheme. However, due to numerical approximation of the DC power flow equation, the DC optimal power flow model may obtain uneconomical and even unsafe scheduling schemes, which is more pronounced in power systems with low safety margins and tightly coupled active and reactive power. The electric power industry needs a linear network model that can consider reactive power and voltage.

The AC optimal power flow model considering reactive power and voltage is a non-linear model, and the solving methods include convex relaxation method, interior point method, etc.

Convex relaxation includes semi-definite programming (SDP) relaxation, second order cone programming (SOCP) relaxation, and quadratic programming (QP) relaxation. However, each of these methods has large errors, and is difficult to put into application in the actual power grid. The convergence of the interior point method cannot be guaranteed.

In the following, a dispatch method and device for a power system according to some embodiments of the present disclosure will be described in detail with reference to the drawings.

Figure 1:
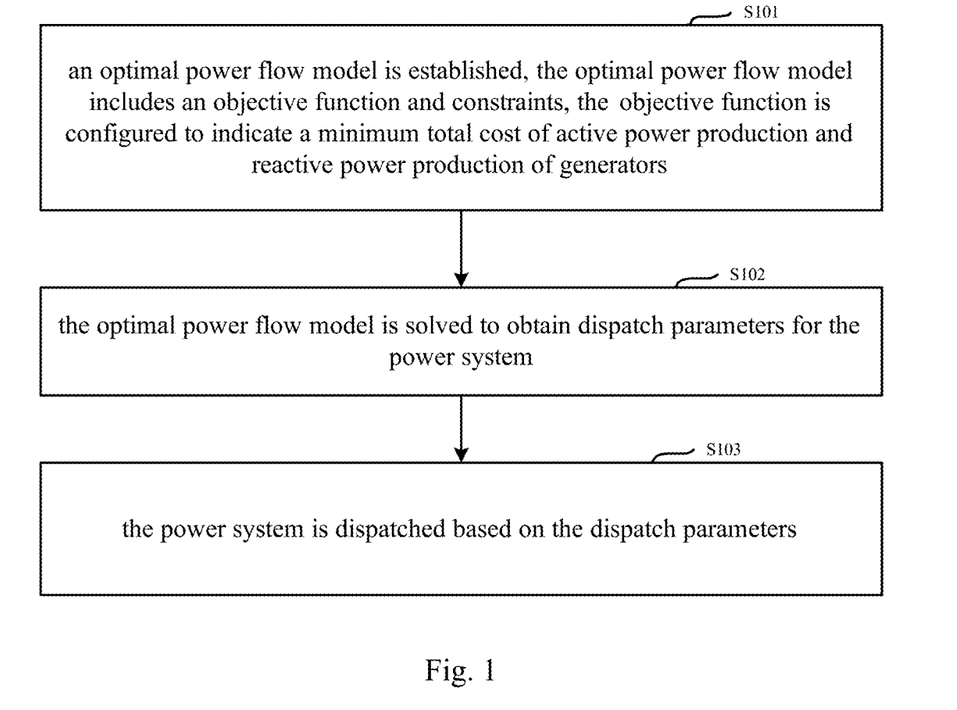
FIG. 1 is a flowchart of a dispatch method for a power system according to some embodiments of the present disclosure.

FIG. 1 is a flowchart of a dispatch method for a power system according to some embodiments of the present disclosure. As shown in FIG. 1, the method includes following steps.

At block S101, an optimal power flow model is established, the optimal power flow model includes an objective function and constraints, the objective function is configured to indicate a minimum total cost of active power production and reactive power production of generators.

At block S102, the optimal power flow model is solved to obtain dispatch parameters for the power system.

At block S103, the power system is dispatched based on the dispatch parameters.

Figure 2:
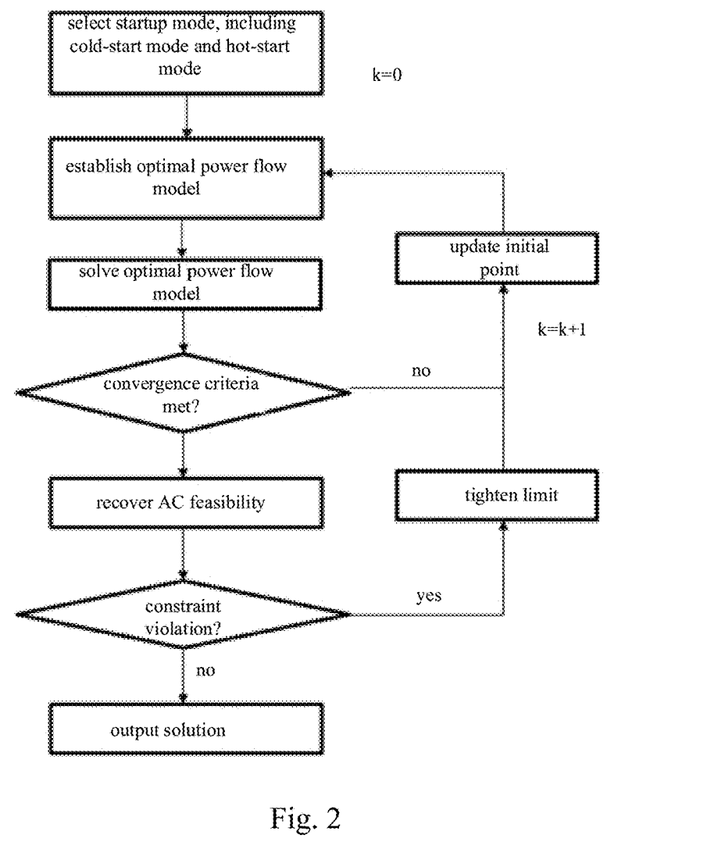
FIG. 2 is a flowchart of a dispatch method for a power system according to some embodiments of the present disclosure.

FIG. 2 is a flowchart of a dispatch method for a power system according to some embodiments of the present disclosure, as shown in FIG. 2, the dispatch further includes the followings.

1) The optimal power flow model is established, and the model includes an objective function and constraints.

In an example, the objective function is configured to indicate the minimum total cost of active power production and reactive power production of generators, which may be expressed as follows:

$$\min_{g \in \mathcal{G}} f_g^P(P_g) + f_g^Q(Q_g) \quad (1)$$

where $P_g$ denotes active power production of generator g, $Q_g$ denotes reactive power production of generator g, $\mathcal{G}$ denotes the generator set, $f_g^P(P_g)$ denotes the cost function of $P_g$, $f_g^Q(Q_g)$ denotes the cost function of $Q_g$.

1-2) The constraints of the model are determined, which may include the followings.

1-2-1) The power flow equation constraints based on reduced order network are determined.

The initial point of k-th (k=1, 2, 3 ...) iteration is ($v_{i,k-1}$, $\theta_{i,k-1}$), $i \in \mathcal{N}$, $\mathcal{N}$ denotes the bus set. When k>1, $v_{i,k-1}$ denotes the voltage magnitude of the bus i after (k−1)th iteration, $\theta_{i,k-1}$ denotes the voltage angle of the bus i after (k−1)th iteration. When k=1, initial point ($v_{i,k-1}$, $\theta_{i,k-1}$) may be obtained by two startup modes, inducing the cold-start mode and hot-start mode.

In the cold-start mode, $v_{i,0}=1$ p. u., $\theta_{i,0}=0$. In the hot-start mode, $v_{i,0}=1$ p. u., $\theta_{i,0}$ takes the solution of DC optimal power flow. The power flow equation constraints may be expressed as follows:

$$P_{ij} = g_{ij}v_i^2 - g_{ij,k}^P \frac{v_i^2 + v_j^2}{2} - b_{ij,k}^P(\theta_i - \theta_j) + g_{ij,k}^P \frac{v_{ij,L}^S + \theta_{ij,L}^S}{2} \quad (2)$$

$$Q_{ij} = -b_{ij}v_i^2 + b_{ij,k}^Q \frac{v_i^2 + v_j^2}{2} - g_{ij,k}^Q(\theta_i - \theta_j) - b_{ij,k}^Q \frac{v_{ij,L}^S + \theta_{ij,L}^S}{2} \quad (3)$$

where $P_{ij}$ denotes the active power flow of branch (i, j), $Q_{ij}$ denotes the reactive power flow of branch (i, j), $v_i$ denotes the voltage magnitude of bus i, $v_j$ denotes the voltage magnitude of bus j, $\theta_i$ denotes the voltage angle of bus i, $\theta_j$ denotes the voltage angle of bus j, $v_{ij}$ denotes the voltage magnitude difference between bus i and bus j of branch (i, j), $v_{ij}=v_i-v_j$, $\theta_{ij}$ denotes the voltage angle difference between bus i and bus j of branch (i, j), $\theta_{ij}=\theta_i-\theta_j$, $g_{ij,k}^P$ and $b_{ij,k}^P$ denote the active balance coefficients of kth iteration, $b_{ij,k}^Q$ and $g_{ij,k}^Q$ denote the reactive balance coefficients of kth iteration.

In the above formula (2) and (3), $v_{ij,L}^S$ denotes the effect of voltage magnitude on network loss, which satisfies:

$$\text{when } k > 1, v_{ij,L}^S = 2\frac{v_{i,k-1} - v_{j,k-1}}{v_{i,k-1} + v_{j,k-1}}(v_i^2 - v_j^2) - v_{ij,k-1}^2 \quad (4)$$

$$\text{when } k = 1, v_{ij,L}^S = 2\frac{v_{i,est} - v_{j,est}}{v_{i,est} + v_{j,est}}(V_i^2 - v_j^2) - v_{ij,est}^2 \quad (5)$$

$$v_{ij,L}^S \geq 0 \quad (6)$$

where $v_{ij,est}$ denotes an estimated voltage magnitude difference between bus i and bus j of branch (i, j), $v_{i,est}$ denotes an estimated voltage magnitude of bus i, $v_{j,est}$ denotes an estimated voltage magnitude of bus j, $v_{ij,k-1}$ denotes the voltage magnitude difference of branch (i, j) obtained from (k−1)th iteration.

In the above formula (2) and (3), $\theta_{ij,L}^S$ denotes the effect of voltage angle on network loss, which satisfies:
when k=1, and in the cold-start mode, $$\theta_{ij,L}^S = g_{ij}\theta_{ij,est} \cdot \theta_{ij} - \tfrac{1}{2}g_{ij}\theta_{ij,est}^2 \quad (7)$$

$$\theta_{ij,L}^S \geq 0 \quad (8)$$

where $\theta_{ij,est}$ denotes an estimated voltage angle difference between bus i and bus j of branch (i, j), $g_{ij}$ denotes the conductance of branch (i, j);

when k>1, and in any startup mode, or k=1, and in the hot-start mode, $$\theta_{ij,L}^S = 0 \quad (9)$$

In an embodiment, the active balance coefficients $g_{ij,k}^P$ and $b_{ij,k}^P$ may be expressed by:

$$g_{ij,k}^P = (g_{ij}c_{ij,k}^0 + b_{ij}s_{ij,k}^0) + (g_{ij}c_{ij,k}^1 + b_{ij}s_{ij,k}^1)\theta_{ij,k-1} \quad (10)$$

$$b_{ij,k}^P = (g_{ij}c_{ij,k}^1 + b_{ij}s_{ij,k}^1)v_{i,k-1}v_{j,k-1} \quad (11)$$

and the active balance coefficients $b_{ij,k}^Q$ and $g_{ij,k}^Q$ may be expressed by:

$$b_{ij,k}^Q = (-g_{ij}s_{ij,k}^0 + b_{ij}c_{ij,k}^0) - (g_{ij}s_{ij,k}^1 - b_{ij}c_{ij,k}^1)\theta_{ij,k-1} \quad (12)$$

$$g_{ij,k}^Q = (g_{ij}s_{ij,k}^1 - b_{ij}c_{ij,k}^1)v_{i,k-1}v_{j,k-1} \quad (13)$$

where $b_{ij}$ denotes the susceptance of branch (i, j), $s_{ij,k}^1$ and $s_{ij,k}^1$ are coefficients for the Taylor series expansion of the sine function, which may be expressed by:

$$s_{ij}^1 = \cos\theta_{ij,k-1}, s_{ij,k}^0 = \sin\theta_{ij,k-1} - \theta_{ij,k-1}\cos\theta_{ij,k-1} \quad (14)$$

and $c_{ij,k}^1$ and $c_{ij,k}^0$ are coefficients for the Taylor series expansion of the cosine function $$c_{ij,k}^1 = -\sin\theta_{ij,k-1}, c_{ij,k}^0 = \cos\theta_{ij,k-1} + \theta_{ij,k-1}\sin\theta_{ij,k-1} \quad (15)$$

1-2-2) Nodal balance constraint is determined.

In some embodiments, the nodal balance constraint may be expressed by:

$$P_i = \Sigma_{(i,j) \in \mathcal{K}_i} P_{ij} + g_{ii} \cdot v_i^2 \quad (16)$$

$$Q_i = \Sigma_{(i,j) \in \mathcal{K}_i} Q_{ij} - b_{ii} \cdot v_i^2 \quad (17)$$

where $\mathcal{K}_i$ denotes the set of buses connected to bus i through branches, $g_{ii}$ denotes the ground conductance of bus i, and $b_{ii}$ denotes the ground susceptance of the bus i.

1-2-3) Nodal injection constraint is determined.

In some embodiments, the nodal injection constraint may be expressed by:

$$P_i = \Sigma_{g \in \mathcal{G}_i} P_g - P_{d,i}, i \in \mathcal{N}$$

$$Q_i = \Sigma_{g \in \mathcal{G}_i} Q_g - Q_{d,i}, i \in \mathcal{N}$$

where $\mathcal{G}_i$ denotes the set of generators connected to bus i, $P_{d,i}$ denotes the active load consumption at bus i, $Q_{d,i}$ denotes the reactive load consumption at bus i.

1-2-4) The linearized apparent power flow limit is determined.

In some embodiments, linearized apparent power flow limit can be expressed by:

$$\Lambda(P_{ij}, Q_{ij}): L_{ij}^{u,n} \geq 0, n=1, \ldots, N; L_{ij}^{d,m} \geq 0, m=1, \ldots, M, (i,j) \in \mathcal{K} \quad (20)$$

where $\mathcal{K}$ denotes the set of buses.

Figure 3:
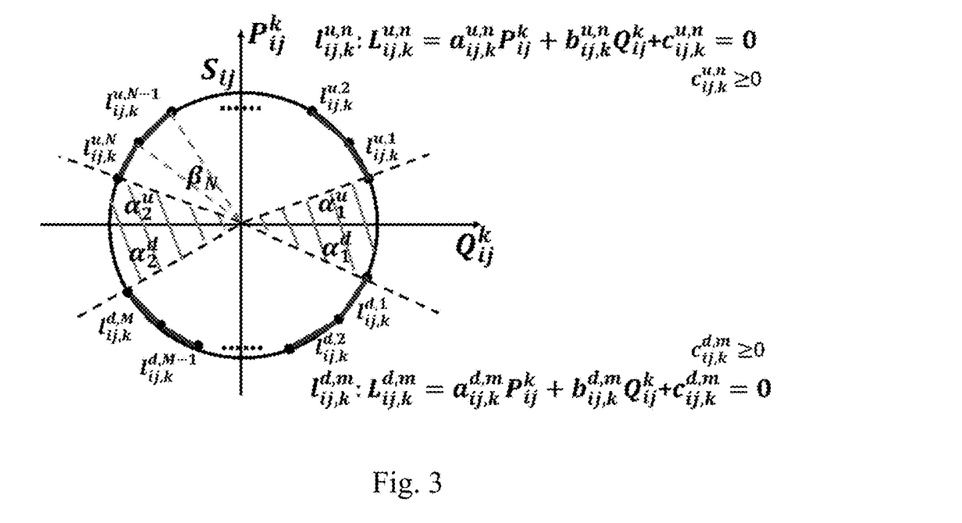
FIG. 3 is a schematic diagram illustrating linearized apparent power flow limit according to some embodiments of the present disclosure.

In some embodiments, an idea of calculating the linearized apparent power flow limit is to approximate the arc with multiple segments. FIG. 3 is a schematic diagram illustrating linearized apparent power flow limit according to some embodiments of the present disclosure, as shown in FIG. 2, following acts may be included.

1-2-4-1) Parameters such as radian values $\alpha_1^u$, $\alpha_2^u$, $\alpha_1^d$, $\alpha_2^d$ are selected, and the value range of $\alpha_1^u, \alpha_2^u, \alpha_1^d, \alpha_2^d$ is $[0, \pi]$. Based on the ratio of active and reactive power in the line flow, the piecewise linear approximation is only performed on arcs corresponding to $[\alpha_1^u, \pi - \alpha_2^u]$ and $[\alpha_1^u, \pi - \alpha_2^u]$.

1-2-4-2) parameters M, N are selected, M is the number of segments of the upper half planes, and N is number of segments of the lower half planes, and the value range of M and N is [10,100]. The arc defined by $[\alpha_1^u, \pi - \alpha_2^u]$ is evenly divided into N parts, and by connecting adjacent endpoints with line segments (as shown in the line segment in FIG. 2), N line segments $1_{ij}^{u,1}, \ldots, 1_{ij}^{u,N}$ are obtained. The arc defined by $[\pi + \alpha_2^d, 2\pi - \alpha_1^d]$ is evenly divided into M parts, and by connecting adjacent endpoints with line segments, M line segments $1_{ij}^{d,1}, \ldots, 1_{ij}^{d,M}$ are obtained.

1-2-4-3) By approximating the quadratic apparent power flow limit using the combination of linear constraints corresponding to the (M+N) line segments, the linearized apparent power flow limit as shown in equation (20) can be obtained.

1-2-5) The generator active power limit, the generator reactive power limit, and the bus voltage limit are determined.

In some embodiments, the generator active power limit, the generator reactive power limit, and the bus voltage limit may be expressed by:

$$P_{g,min} \leq P_g \leq P_{g,max}, g \in \mathcal{G} \quad (21)$$

$$Q_{g,min} \leq Q_g \leq Q_{g,max}, g \in \mathcal{G} \quad (22)$$

$$v_{i,min}^2 \leq v_i^2 \leq v_{i,max}^2, i \in \mathcal{N} \quad (23)$$

where $P_{g,max}$ denotes an upper limit of active power production of generator g, $P_{g,min}$ denotes a lower limit of active power production of generator g, $Q_{g,max}$ denotes an upper limit of reactive power production of generator g, $Q_{g,min}$ denotes a lower limit of reactive power production of generator g, $v_{i,max}$ denotes an upper limit of voltage magnitude of bus i, $v_{i,min}$ denotes a lower limit of voltage magnitude of bus i, When $\theta$ and $v^2$ are independent variables, the constraint of the optimal power flow model is linear.

2) The model established in step 1) is solved to obtain the dispatching scheme of the power system.

In some embodiments, the model may be solved by solvers such as Cplex, Gurobi. Let the current iteration number be k, the optimal solutions $v_i$, $\theta_i$, $P_g$, $Q_g$ ($i \in \mathcal{N}$, $g \in \mathcal{G}$) of the kth iteration can be obtained, and the active power flow $P_{ij}^k$ and the reactive power flow $Q_{ij}^k$ of branch (i, j) after kth iteration can be obtained according to power flow constraints (2) and (3).

By substituting the optimal solution $v_i$ and $\theta_i$ of the kth iteration into the line AC power flow equation, active power flow $P_{ij}$ and the reactive power flow $Q_{ij}$ may be obtained:

$$P_{ij} = g_{ij}(v_i^2 - v_i v_j \cos \theta_{ij}) - b_{ij} v_i v_j \sin \theta_{ij} \quad (24)$$

$$Q_{ij} = -b_{ij}(v_i^2 - v_i v_j \cos \theta_{ij}) - g_{ij} v_i v_j \sin \theta_{ij} \quad (25)$$

According to the values of $P_{ij}^k$, $Q_{ij}^k$, $P_{ij}Q_{ij}$, the standardization error may be examined for each branch, the expression is as follows:

$$\Delta_{ij} = \frac{\sqrt{(P_{ij}^k)^2 + (Q_{ij}^k)^2} - \sqrt{(P_{ij})^2 + (Q_{ij})^2}}{\max_{(i,j) \in \mathcal{K}} \sqrt{(P_{ij})^2 + (Q_{ij})^2}}, (i,j) \in \mathcal{K} \quad (26)$$

where $\Delta_{ij}$ denotes the approximate error of the power flow equation of branch (i, j).

When $\Delta_{ij} < \Delta_{tol}$ for all branches, $\Delta_{tol}$ denotes an upper limit of the linear approximation error, and the value range is [1e-4, 1e-2], it is determined that the model converges, the iteration ends, and $v_i, \theta_i, P_g, Q_g, i \in \mathcal{N}, g \in \mathcal{G}$ are output, and the dispatching scheme for power system including the nodal voltage magnitude, the voltage angle, the active and reactive power production of the generator can be obtained. Otherwise, let k=k+1, and take the optimal solution $v_i$ and $\theta_i$ of the kth iteration as the initial values $v_{i,k-1}$ and $v_{i,k-1}$ to update the power flow constraint, and return to step 2) to perform next iteration.

In order to improve the accuracy of the solution, after the iteration, following acts may be included.

3) AC feasibility restoration is performed on the solution.

Figure 4:
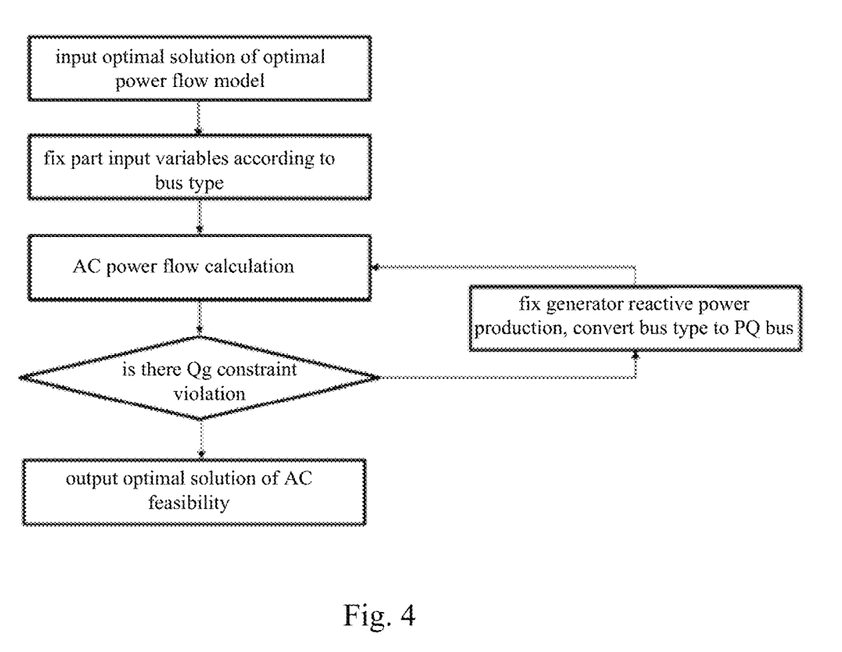
FIG. 4 is a flowchart illustrating AC feasibility recover according to some embodiments of the present disclosure.

In some embodiments, the power flow calculation may be used to restore AC feasibility from the solution. FIG. 4 is a flowchart illustrating AC feasibility recover according to some embodiments of the present disclosure. As shown in FIG. 4, following acts may be included.

Based on the optimal power flow solution, the value of the variable is fixed to prepare input data for power flow calculation. The variables that need to be fixed includes v and θ of a reference bus, P and Q of the PQ bus (the bus with fixed value of P and Q), P and v of the PV bus (the bus with the fixed value of P and V). Based on the input conditions, AC power flow calculation is performed. In the solution obtained from the AC power flow calculation, when there are reactive power overruns in a generator, the reactive power production of the generator is fixed, the bus type is converted into a PQ bus, and the AC power flow calculation is re-performed. Finally, the optimal power flow solution is obtained.

4) It is determined whether the solution is beyond a limit.

An upper limit $\gamma_{max}$ (a positive number less than 1) is set, when the constraint overrun rate is greater than $\gamma_{max}$, it is determined to be out of limit. The optimal flow solution of AC feasibility is checked, the corrected active power flow and corrected reactive power flow are calculated according to equations (24) and (25), and the corrected active power flow and corrected reactive power flow may be squared, and summed, and then rooted, to obtain the corrected complex line power $S_{ij}$.

When $S_{ij}=S_{max,ij}(1+\gamma_{ij})$, $\gamma_{ij} \geq \gamma_{max}$, it is determined to be out of limit, $\gamma_{ij}$ is the out-of-limit rate of apparent power of branch (i, j). The out-of-limit determination of the active power production of generator on the slack bus and the out-of-limit determination of voltage magnitude of PQ bus may be similarly determined, for example, based on formula (21) and $\gamma_{max}$, and formula (23) and $\gamma_{max}$. When any of the above limits is exceeded, step 5) is proceeded, when there is no limit violation, step 6) is proceeded. 5) The out-of-limit constraint is corrected.

For the branch (i, j) whose apparent power is out of limit, in the next iteration, the upper limit of the apparent power of branch (i, j) will be modified as:

$$S_{ij,max}=S_{ij,max}(1-L\gamma_{ii}) \quad (27)$$

When the active power production of the generator on the slack bus is out of limit, the active power limit of the generator may be similarly adjusted in the next iteration, and when the voltage magnitude of the PQ is out of limit, the voltage magnitude limit may be similarly adjusted. In the next iteration, the power flow equation constraint may be updated by using the optimal solution $v_i$, $\theta_i$, $i \in \mathcal{N}$ of the model in the current iteration as the initial points ($v_{i,k-1}$, $\theta_{i,k-1}$) of the power flow constraint of the reduced-order network, and step 2) is returned to perform next iteration. Finally, the optimal solution $v_i$, $\theta_i$, $P_g$, $Q_g$, $i \in \mathcal{N}$, $g \in \mathcal{G}$ of the model may be output, and the dispatching scheme including parameter such as the voltage magnitude, the voltage angle, the active power and reactive power production of the generator are obtained.

With the method according to embodiments of the present disclosure, the active power and voltage angle are considered, economy and safety can be ensured, and the method may also be applied in power systems with low safety margins and tight coupling of active and reactive power. Moreover, the method can reduce the non-convexity and non-linearity of the optimal power flow, thereby ensuring that its solution algorithm meets the application requirements of the power industry, and in the case of poor initial iteration values, linearization error of the power flow equation can also be reduced, and since only linear model is solved in each iteration, the solution efficiency can be improved.

The present disclosure further provides some case studies. In the case studies, the performance of the method in the present disclosure is tested on several IEEE benchmark systems. Data for all test cases are obtained from Matpower 4.1, and Gurobi is used for solving. The parameters used in the case studies may be illustrated in the following tables.

TABLE 1

| symbol | meaning | value |
|---|---|---|
| $\alpha_1^u$, $\alpha_2^u$, $\alpha_1^d$, $\alpha_2^d$ | angles in linearized apparent power flow limit | $\pi/6$ |
| M, N | number of segments of linearized apparent power flow limit | 15 |
| $\Delta_{tol}$ | maximum linearization error in convergence criteria | 1e−2 |

TABLE 1-continued

| symbol | meaning | value |
|---|---|---|
| $\gamma_{max}$ | constraint out-of-limit threshold | 1e−3 |
| L | scale factor for tightening operating constraints | 0.1 |

In the following, the calculation effect under cold-start mode (v=1.0 p.u., θ=0 as initial value) is tested, and most test systems are congested, the calculation results are shown in Table 2.

TABLE 2

| test system | constraint | Solution time (s) (number of iterations) | error of objective function |
|---|---|---|---|
| IEEE 14-bus | no | 0.072 (3) | 0.016% |
| IEEE 30-bus | no | 0.096 (2) | 0.10% |
| IEEE 39-bus | no | 0.11 (2) | 0.041% |
| IEEE 57-bus | no | 0.14 (2) | 0.052% |
| IEEE 118-bus | no | 0.68 (3) | 0.030% |
| IEEE 300-bus | no | 1.5 (3) | 0.0051% |
| Polish 2383 wp | no | 2.1 (3) | 0.026% |
| Polish 2737 sop | no | 2.4 (3) | 0.0063% |
| Polish 2746 wop | no | 2.5 (3) | 0.025% |
| Polish 2746 wp | no | 2.3 (3) | 0.038% |
| Polish 3012 wp | no | 2.7 (3) | 0.0049% |

In the following, the calculation effect under hot-start mode (v=1.0 p.u., θ takes the solution of DC optimal power flow as initial value) is tested, the calculation results are shown in Table 3.

TABLE 3

| test system | constraint | solution time (s) (number of iterations) | error of objective function |
|---|---|---|---|
| IEEE 14-bus | no | 0.050 (2) | 0.022% |
| IEEE 30-bus | no | 0.092 (2) | 0.069% |
| IEEE 39-bus | no | 0.13 (2) | 0.018% |
| IEEE 57-bus | no | 0.27 (3) | 0.10% |
| IEEE 118-bus | no | 0.44 (2) | 0.12% |
| IEEE 300-bus | no | 0.87 (2) | 0.0049% |
| Polish 2383 wp | no | 2.8 (3) | 0.042% |
| Polish 2737 sop | no | 1.9 (2) | 0.019% |
| Polish 2746 wop | no | 1.8 (2) | 0.00015% |
| Polish 2746 wp | no | 1.8 (2) | 0.0018% |
| Polish 3012 wp | no | 2.5 (3) | 0.026% |

The above experimental results show that the method according to embodiments of the present disclosure can have strong practical applicability.

Figure 5:
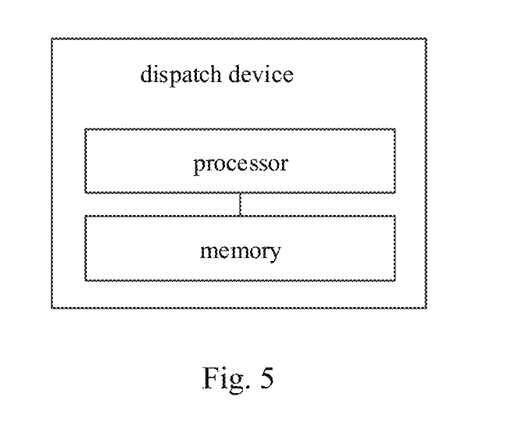
FIG. 5 is a block diagram of a dispatch device for a power system according to some embodiments of the present disclosure.

FIG. 5 is a block diagram of a dispatch device for a power system according to some embodiments of the present disclosure, as shown in FIG. 5, the dispatch device includes a processor and a memory. The memory is configured to store instructions executable by the processor. When the instructions are executed by the processor, the processor is caused to execute the dispatch method for a power system according to embodiments of the present disclosure.

To implement the above embodiments, the present disclosure further provides a non-transitory computer-readable storage medium according to embodiments of the present disclosure will be described in detail. In some embodiments, the non-transitory computer-readable storage medium having stored therein instructions that, when executed by a processor of a terminal, causes the terminal to perform method according to the above embodiments of the present disclosure for running an application program.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A dispatch method for a power system, comprising:
establishing an optimal power flow model, wherein the optimal power flow model comprises an objective function and constraints, the objective function is configured to indicate a minimum total cost of active power production and reactive power production of generators;
solving the optimal power flow model to obtain dispatch parameters for the power system; and
dispatching the power system based on the dispatch parameters,
wherein the constraints comprise a power flow equation constraint, a startup mode of the optimal power flow model comprises a cold-start mode and a hot-start mode,
the power flow equation constraint is expressed by:

$$P_{ij} = g_{ij}v_i^2 - g_{ij,k}^P \frac{v_i^2 + v_j^2}{2} - b_{ij,k}^P(\theta_{ij} - \theta_{ij,k}) + g_{ij,k}^P \frac{v_{ij,L}^s + \theta_{ij,L}^s}{2};$$

$$Q_{ij} = -b_{ij}v_i^2 + b_{ij,k}^Q \frac{v_i^2 + v_j^2}{2} - g_{ij,k}^Q(\theta_{ij} - \theta_{ij,k}) - b_{ij,k}^Q \frac{v_{ij,L}^s + \theta_{ij,L}^s}{2};$$

where $P_{ij}$ denotes an active power flow of a branch (i, j), $Q_{ij}$ denotes a reactive power flow of the branch (i, j), $v_i$ denotes a voltage magnitude of a bus i, $v_j$ denotes a voltage magnitude of a bus j, $\theta_i$ denotes a voltage angle of the bus i, $\theta_j$ denotes a voltage angle of the bus j, $v_{ij}$ denotes a voltage magnitude difference between the bus i and the bus j of the branch (i, j), $v_{ij}=v_i-v_j$, $\theta_{ij}$ denotes a voltage angle difference between the bus i and the bus j of the branch (i, j), $\theta_{ij}=\theta_i-\theta_j$, $g_{ij,k}^P$ and $b_{ij,k}^P$ denote the active balance coefficients of kth iteration, $b_{ij,k}^Q$ and $g_{ij,k}^Q$ denote reactive balance coefficients of kth iteration, $v_{ij,L}^s$ denotes an effect of voltage magnitude on network loss, $\theta_{ij,L}^s$ denotes an effect of voltage angle on the network loss, k is an integer greater than or equal to 0.

2. The dispatch method according to claim 1, wherein the objective function of the optimal power flow model is expressed by:

$$\min_{g \in \mathcal{G}} f_g^P(P_g) + f_g^Q(Q_g)$$

where $P_g$ denotes an active power production of a generator g, $Q_g$ denotes a reactive power production of the generator g, $\mathcal{G}$ denotes a generator set, $f_g^P(P_g)$ denotes a cost function of $P_g$, $f_g^Q(Q_g)$ denotes a cost function of $Q_g$.

3. The dispatch method according to claim 1, wherein $v_{ij,L}^s$ is expressed by:

when $k > 1$, $v_{ij,L}^S = 2\frac{v_{i,k-1} - v_{j,k-1}}{v_{i,k-1} + v_{j,k-1}}(v_i^2 - v_j^2) - v_{ij,k-1}^2$;

when $k = 1$, $v_{ij,L}^S = 2\frac{v_{i,est} - v_{j,est}}{v_{i,est} + v_{j,est}}(V_i^2 - v_j^2) - v_{ij,est}^2$;

$v_{ij,L}^S \geq 0$;

where $v_{ij,est}$ denotes an estimated voltage magnitude difference between the bus i and the bus j of the branch (i, j), $v_{i,est}$ denotes an estimated voltage magnitude of the bus i, $v_{j,est}$ denotes an estimated voltage magnitude of the bus j, $v_{ij,k-1}$ denotes a voltage magnitude difference of the branch (i, j) obtained from (k-1)th iteration;

$\theta_{ij,L}^s$ is expressed by:
when k=1, and in the cold-start mode, $$\theta_{ij,L}^s = g_{ij}\theta_{ij,est} \cdot \theta_{ij} - \tfrac{1}{2}g_{ij}\theta_{ij,est}^2;$$

$\theta_{ij,L}^s \geq 0$;

where $\theta_{ij,est}$ denotes an estimated voltage angle difference between the bus i and the bus j of the branch (i, j), $g_{ij}$ denotes a conductance of the branch (i, j);
when k>1 and in any startup mode, or k=1 and in the hot-start mode, $\theta_{ij,L}^s = 0$.

4. The dispatch method according to claim 1, wherein active balance coefficients $g_{ij,k}^P$ and $b_{ij,k}^P$ are expressed by:

$g_{ij,k}^P = (g_{ij}c_{ij,k}^0 + b_{ij}s_{ij,k}^0) + (g_{ij}c_{ij,k}^1 + b_{ij}s_{ij,k}^1)\theta_{ij,k-1}$;

$b_{ij,k}^P = (g_{ij}c_{ij,k}^1 + b_{ij}s_{ij,k}^1)v_{ij,k-1} - v_{ij,k-1}$;

the active balance coefficients $b_{ij,k}^Q$ and $g_{ij,k}^Q$ may be expressed by:

$b_{ij,k}^Q = (-g_{ij}s_{ij,k}^0 + b_{ij}c_{ij,k}^0) - (g_{ij}s_{ij,k}^1 - b_{ij}c_{ij,k}^1)\theta_{ij,k-1}$;

$g_{ij,k}^Q = (g_{ij}s_{ij,k}^1 - b_{ij}c_{ij,k}^1)v_{i,k-1} - v_{i,k-1}$;

where $b_{ij}$ denotes the susceptance of branch (i, j), $s_{ij,k}^1$ and $s_{ij,k}^0$ are coefficients for a Taylor series expansion of a sine function, and $C_{ij,k}^1$ and $C_{ij,k}^0$ are coefficients for a Taylor series expansion of a cosine function, wherein $s_{ij,k}^1$ and $s_{ij,k}^0$ are expressed by:

$s_{ij}^1 = \cos\theta_{ij,k-1}, s_{ij,k}^0 = \sin\theta_{ij,k-1} - \theta_{ij,k-1}\cos\theta_{ij,k-1}$;

$c_{ij,k}^1$ and $c_{ij,k}^0$ are expressed by:

$c_{ij,k}^1 = -\sin\theta_{ij,k-1}, c_{ij,k}^0 = \cos\theta_{ij,k-1} + \theta_{ij,k-1}\sin\theta_{ij,k-1}$.

5. The dispatch method according to claim 1, wherein the constraints comprise a nodal balance constraint, and the nodal balance constraint is expressed by:

$P_i = \Sigma_{(ij) \in \mathcal{K}_i} P_{ij} + g_{ii} \cdot v_i^2$;

$Q_i = \Sigma_{(ij) \in \mathcal{K}_i} Q_{ij} - b_{ii} \cdot v_i^2$;

where $\mathcal{K}_i$ denotes a set of buses connected to a bus i through branches, $g_{ii}$ denotes a ground conductance of the bus i, and $b_{ii}$ denotes a ground susceptance of the bus i.

6. The dispatch method according to claim 1, wherein the constraints comprise a nodal injection constraint, and the nodal injection constraint is expressed by:

$P_i = \Sigma_{g \in \mathcal{G}_i} P_g - P_{d,i}, i \in \mathcal{N}$;

$Q_i = \Sigma_{g \in \mathcal{G}_i} Q_g - Q_{d,i}, i \in \mathcal{N}$;

where $\mathcal{G}_i$ denotes a set of generators connected to a bus i, $P_{d,i}$ denotes an active load consumption at the bus i, $Q_{d,i}$ denotes a reactive load consumption at the bus i.

7. The dispatch method according to claim 1, wherein the constraints comprise a linearized power flow constraint, and the linearized power flow constraint is expressed by:

$\Lambda(P_{ij}, Q_{ij}) : L_{ij}^{u,n} \geq 0, n = 1, \ldots, N; L_{ij}^{d,m} \geq 0,$
$m = 1, \ldots, M, (i,j) \in \mathcal{K}$;

where $\mathcal{K}$ denotes a set of buses; $L_{ij}^{u,n}$ and $L_{ij}^{d,m}$ are piecewise segments of the optimal power flow model.

8. A dispatch device for a power system, comprising:
a processor;
a memory configured to store an instruction executable by the processor;
wherein the processor is configured to:
  establish an optimal power flow model, wherein the optimal power flow model comprises an objective function and constraints, the objective function is configured to indicate a minimum total cost of active power production and reactive power production of generators;
  solve the optimal power flow model to obtain dispatch parameters for the power system; and
  dispatch the power system based on the dispatch parameters,
wherein the constraints comprise a power flow equation constraint, a startup mode of the optimal power flow model comprises a cold-start mode and a hot-start mode,
the power flow equation constraint is expressed by:

$$P_{ij} = g_{ij}v_i^2 - g_{ij,k}^P \frac{v_i^2 + v_j^2}{2} - b_{ij,k}^P(\theta_{ij} - \theta_{ij,k}) + g_{ij,k}^P \frac{v_{ij,L}^s + \theta_{ij,L}^s}{2};$$

$$Q_{ij} = -b_{ij}v_i^2 + b_{ij,k}^Q \frac{v_i^2 + v_j^2}{2} - g_{ij,k}^Q(\theta_{ij} - \theta_{ij,k}) - b_{ij,k}^Q \frac{v_{ij,L}^s + \theta_{ij,L}^s}{2};$$

where $P_{ij}$ denotes an active power flow of a branch (i, j), $Q_{ij}$ denotes a reactive power flow of the branch (i, j), $v_i$ denotes a voltage magnitude of a bus i, $v_j$ denotes a voltage magnitude of a bus j, $\theta_i$ denotes a voltage angle of the bus i, $\theta_j$ denotes a voltage angle of the bus j, $v_{ij}$ denotes a voltage magnitude difference between the bus i and the bus j of the branch (i, j), $v_{ij} = v_i - v_j$, $\theta_{ij}$ denotes a voltage angle difference between the bus i and the bus j of the branch (i, j), $\theta_{ij} = \theta_i - g_{ij,k}^P$ and $b_{ij,k}^P$ denote active balance coefficients of kth iteration, $b_{ij,k}^Q$ and $g_{ij,k}^Q$ denote reactive balance coefficients of kth iteration, $v_{ij,L}{}^s$ denotes an effect of voltage magnitude on network loss, $\theta_{ij,L}{}^s$ denotes an effect of voltage angle on the network loss, k is an integer greater than or equal to 0.

9. The dispatch device according to claim 8, wherein the objective function of the optimal power flow model is expressed by:

$$\min_{g\in \mathcal{G}} f_g^P(P_g)+f_g^Q(Q_g);$$

where $P_g$ denotes an active power production of a generator g, $Q_g$ denotes a reactive power production of the generator g, $\mathcal{G}$ denotes a generator set, $f_g^P(P_g)$ denotes a cost function of $P_g$, $f_g^Q(Q_g)$ denotes a cost function of $Q_g$.

10. The dispatch device according to claim 8, wherein $v_{ij,L}{}^s$ is expressed by:

when $k>1$, $v_{ij,L}^S = 2\frac{v_{i,k-1}-v_{j,k-1}}{v_{i,k-1}+v_{j,k-1}}(v_i^2-v_j^2)-v_{ij,k-1}^2$;

when $k=1$, $v_{ij,L}^S = 2\frac{v_{i,est}-v_{j,est}}{v_{i,est}+v_{j,est}}(V_i^2-v_j^2)-v_{ij,est}^2$;

$v_{ij,L}^S \geq 0$;

where $v_{ij,est}$ denotes an estimated voltage magnitude difference between the bus i and the bus j of the branch (i, j), $v_{i,est}$ denotes an estimated voltage magnitude of the bus i, $v_{j,est}$ denotes an estimated voltage magnitude of the bus j, $v_{ij,k-1}$ denotes a voltage magnitude difference of the branch (i, j) obtained from (k−1)th iteration; $\theta_{ij,L}{}^s$ is expressed by:
when k=1, and in the cold-start mode, $$\theta_{ij,L}{}^s=g_{ij}\theta_{ij,est}\cdot\theta_{ij}-\tfrac{1}{2}g_{ij}\theta_{ij,est}{}^2;$$

$\theta_{ij,L}{}^s \geq 0$;

where $\theta_{ij,est}$ denotes an estimated voltage angle difference between the bus i and the bus j of the branch (i, j), $g_{ij}$ denotes a conductance of the branch (i, j);
when k>1 and in any startup mode, or k=1 and in the hot-start mode, $\theta_{ij,L}{}^s=0$.

11. The dispatch device according to claim 8, wherein active balance coefficients $g_{ij,k}{}^P$ and $b_{ij,k}{}^P$ are expressed by:

$g_{ij,k}{}^P=(g_{ij}c_{ij,k}{}^0+b_{ij}s_{ij,k}{}^0)+(g_{ij}c_{ij,k}{}^1+b_{ij}s_{ij,k}{}^1)\theta_{ij,k-1};$ $b_{ij,k}{}^P=(g_{ij}c_{ij,k}{}^1+b_{ij}s_{ij,k}{}^1)v_{i,k-1}v_{j,k-1};$ the active balance coefficients $b_{ij,k}{}^Q$ and $g_{ij,k}{}^Q$ are expressed by:

$b_{ij,k}{}^Q=(-g_{ij}s_{ij,k}{}^0+b_{ij}c_{ij,k}{}^0)-(g_{ij}s_{ij,k}{}^1-b_{ij}c_{ij,k}{}^1)\theta_{ij,k-1};$ $g_{ij,k}{}^Q=(g_{ij}s_{ij,k}{}^1-b_{ij}c_{ij,k}{}^1)v_{i,k-1}v_{j,k-1};$ where $b_{ij}$ denotes a susceptance of the branch (i, j), $s_{ij,k}{}^1$ and $s_{ij,k}{}^0$ are coefficients for a Taylor series expansion of a sine function, and $c_{ij,k}{}^Q$ and $c_k$ are coefficients for a Taylor series expansion of a cosine function, wherein $s_{ij,k}{}^1$ and $s_{ij,k}{}^0$ are expressed by:

$s_{ij}{}^1=\cos\theta_{ij,k-1}, s_{ij,k}{}^0=\sin\theta_{ij,k-1}-\theta_{ij,k-1}\cos\theta_{ij,k-1}$ $c_{ij,k}{}^1$ and $c_{ij,k}{}^0$ are expressed by:

$c_{ij,k}{}^1=-\sin\theta_{ij,k-1}, c_{ij,k}{}^0=\cos\theta_{ij,k-1}+\theta_{ij,k-1}\sin\theta_{ij,k-1}.$ 12. The dispatch device according to claim 8, wherein the constraints comprise a nodal balance constraint, and the nodal balance constraint is expressed by:

$P_i=\Sigma_{(i,j)\in\mathcal{K}_i} P_{ij}+g_{ii}\cdot v_i^2;$ $Q_i=\Sigma_{(i,j)\in\mathcal{K}_i} Q_{ij}-b_{ii}\cdot v_i^2;$ where $\mathcal{K}_i$ denotes the set of buses connected to bus i through branches, $g_{ii}$ denotes the ground conductance of bus i, and $b_{ii}$ denotes the ground susceptance of the bus i.

13. The dispatch device according to claim 8, wherein the constraints comprise a nodal injection constraint, and the nodal injection constraint is expressed by:

$P_i=\Sigma_{g\in\mathcal{G}_i} P_g-P_{d,i}, i\in\mathcal{N};$ $Q_i=\Sigma_{g\in\mathcal{G}_i} Q_g-Q_{d,i}, i\in\mathcal{N};$ where $\mathcal{G}_i$ denotes the set of generators connected to bus i, $P_{d,i}$ denotes the active load consumption at bus i, $Q_{d,i}$ denotes the reactive load consumption at bus i.

14. The dispatch device according to claim 8, wherein the constraints comprise a linearized apparent power flow limit, and the linearized apparent power flow limit is expressed by:

$\Lambda(P_{ij},Q_{ij}):L_{ij}{}^{u,n}\geq 0, n=1,\ldots,N; L_{ij}{}^{d,m}\geq 0, m=1,\ldots,M, (i,j)\in\mathcal{K};$ where $\mathcal{K}$ denotes the set of buses, $L_{ij}{}^{u,n}$ and $L_{ij}{}^{d,m}$ are piecewise segments of the optimal power flow model.

15. A non-transitory computer-readable storage medium having stored therein instructions that, when executed by a processor of a terminal, causes the terminal to perform a dispatch method for a power system, the dispatch method comprising:
establishing an optimal power flow model, wherein the optimal power flow model comprises an objective function and constraints, the objective function is configured to indicate a minimum total cost of active power production and reactive power production of generators;
solving the optimal power flow model to obtain dispatch parameters for the power system; and
dispatching the power system based on the dispatch parameters,
wherein the constraints comprise a power flow equation constraint, a startup mode of the optimal power flow model comprises a cold-start mode and a hot-start mode,
the power flow equation constraint is expressed by:

$$P_{ij}=g_{ij}v_i^2-g_{ij,k}^P\frac{v_i^2+v_j^2}{2}-b_{ij,k}^P(\theta_{ij}-\theta_{ij,k})+g_{ij,k}^P\frac{v_{ij,L}^s+\theta_{ij,L}^s}{2};$$

$$Q_{ij}=-b_{ij}v_i^2+b_{ij,k}^Q\frac{v_i^2+v_j^2}{2}-g_{ij,k}^Q(\theta_{ij}-\theta_{ij,k})-b_{ij,k}^Q\frac{v_{ij,L}^s+\theta_{ij,L}^s}{2};$$

where $P_{ij}$ denotes an active power flow of a branch (i, j), $Q_{ij}$ denotes a reactive power flow of the branch (i, j), $v_i$ denotes a voltage magnitude of a bus i, $v_j$ denotes a voltage magnitude of a bus j, $\theta_i$ denotes a voltage angle of the bus i, $\theta_j$ denotes a voltage angle of the bus j, $v_{ij}$ denotes a voltage magnitude difference between the bus i and the bus j of the branch (i, j), $v_{ij}=v_i-v_j$, $\theta_{ij}$ denotes a voltage angle difference between the bus i and the bus j of the branch (i, j), $\theta_{ij}=\theta_i-\theta_j$, $g_{ij,k}{}^P$ and $b_{ij,k}{}^P$ denote active balance coefficients of kth iteration, $b_{ij,k}{}^Q$ and $g_{ij,k}{}^Q$ denote reactive balance coefficients of kth iteration, $v_{ij,L}^s$ denotes an effect of voltage magnitude on network loss, $\theta_{ij,L}^s$ denotes an effect of voltage angle on the network loss, k is an integer greater than or equal to 0.

* * * * *